(12) United States Patent
Hjerpe et al.

(10) Patent No.: US 9,368,783 B2
(45) Date of Patent: Jun. 14, 2016

(54) BATTERY PACK FOR A VEHICLE

(71) Applicant: AUTOLIV DEVELOPMENT AB, Vargarda (SE)

(72) Inventors: Erik Hjerpe, Torslanda (SE); David Sturk, Gothenburg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 233 days.

(21) Appl. No.: 13/771,593

(22) Filed: Feb. 20, 2013

(65) Prior Publication Data
US 2014/0065452 A1  Mar. 6, 2014

(30) Foreign Application Priority Data

Feb. 22, 2012 (EP) .................................. 12156461

(51) Int. Cl.
| B60L 3/04 | (2006.01) |
| H01M 2/34 | (2006.01) |
| H01M 2/10 | (2006.01) |
| B60L 3/00 | (2006.01) |
| B60L 11/18 | (2006.01) |
| H02H 5/08 | (2006.01) |

(52) U.S. Cl.
CPC ............ *H01M 2/345* (2013.01); *B60L 3/0046* (2013.01); *B60L 3/04* (2013.01); *B60L 11/1855* (2013.01); *B60L 11/1864* (2013.01); *H01M 2/1077* (2013.01); *H02H 5/08* (2013.01); *B60L 2240/545* (2013.01); *H01M 2200/20* (2013.01); *Y02T 10/7005* (2013.01); *Y02T 10/7061* (2013.01)

(58) Field of Classification Search
CPC ................................ H01M 2/34; H01M 2/345
USPC ........................................................... 429/61
See application file for complete search history.

(56) References Cited

U.S. PATENT DOCUMENTS

| 5,300,369 A | 4/1994 | Dietrich et al. |
| 6,090,501 A | 7/2000 | Souliac et al. |
| 7,561,394 B2 * | 7/2009 | Mulligan et al. ............. 361/91.1 |

FOREIGN PATENT DOCUMENTS

WO    WO 2005/114810 A1    2/2005

OTHER PUBLICATIONS

European Search Report for European Patent Application No. 12156461 dated Jul. 4, 2012.

* cited by examiner

*Primary Examiner* — Ula C Ruddock
*Assistant Examiner* — Thomas Parsons
(74) *Attorney, Agent, or Firm* — Stephen T. Olson; Harness, Dickey & Pierce, P.L.C.

(57) ABSTRACT

A battery pack for a vehicle includes a plurality of electrically connected battery cells and at least one current interruption device. The at least one current interruption device comprises a movable pressure sensitive element which is engaged by a pressure rise inside the battery pack and whose engagement leads to an electrical disconnection of one or more battery cells.

18 Claims, 2 Drawing Sheets

BATTERY PACK FOR A VEHICLE

CROSS-REFERENCE TO RELATED APPLICATIONS

This application claims the benefit and priority of European Patent Application No. 12156461.1, filed 22 Feb. 2012. The entire disclosure of the above application is incorporated herein by reference.

FIELD

The present disclosure relates to a battery pack for a vehicle.

BACKGROUND

This section provides background information related to the present disclosure which is not necessarily prior art.

Vehicles that use electricity for their motive power, whether only partly like hybrid electric vehicles, or exclusively like full electric vehicles, receive their energy from one or more batteries or battery packs. Each battery pack usually comprises multiple battery cells.

In some cases it can be advantageous to sever the electrical connection to the battery or to the battery packs. Especially in cases when the battery gets damaged, it might release its stored electric energy uncontrolled. A disconnection or termination of the battery can then be very advantageous.

The U.S. Pat. No. 5,238,083 discloses an electric source apparatus for an electric vehicle. Using impact sensors, a calculating circuit, switches and further control means, unit batteries are separated into groups to protect the passengers.

A problem with such an arrangement is that it is rather complex, for example each of the used switches is in electrical contact with the calculating circuit. The used switches each also comprise electrical coils further increasing the complexity of the whole apparatus.

SUMMARY

This section provides a general summary of the disclosure, and is not a comprehensive disclosure of its full scope or all of its features.

In line with this fact, it is the objective of the invention to provide a battery pack for a vehicle in which the previously described problems can be reduced or avoided.

The invention solves this objective with a battery pack comprising a plurality of electrically connected battery cells and at least one current interruption device, wherein the at least one current interruption device comprises a movable pressure sensitive element which is engaged by a pressure rise inside the battery pack and whose engagement leads to an electrical disconnection of one or more battery cells.

A battery pack with these features provides a swift and cost efficient way to disconnect the electrical cells inside the battery pack. The current interruption devices are preferably integrated in the circuit arrangement already used in the battery pack. In particular, there is no need to connect all current interruption devices to some kind of control unit. They function independently and reliably once the pressure inside the battery pack increases above a certain threshold. The pressure increase inside the battery pack may originate from a malfunction inside the battery pack or preferably from an intentional increase, such as the release of compressed gas.

In one embodiment it is preferred that the current interruption device and pressure sensitive element are part of a movable pressure switch that further comprises a conducting element electrically connecting the battery cells, wherein the top cover of the pressure switch is designed to be movable and to move out of its position upon a pressure rise inside the battery pack and to thereby disconnect the battery cells.

The pressure induced movement of the pressure switch cover leads to a change of position of the conducting element, therefore it is preferred that the pressure sensitive element and the conducting element are physically connected. It moves out of position in such a way, that the electrical connection is cut and therefore the current can no longer pass through the movable pressure switch. This way previously connected battery cells become isolated and relatively harmless.

In another embodiment, it is preferred that the pressure sensitive element and the current interruption device are arranged in an open parallel circuit including at least one battery cell, wherein the current interruption device is designed to disconnect the electric connection of the battery cells upon closing of the parallel circuit.

The pressure sensitive element in this embodiment can be similar to the previously described pressure sensitive switch, but with the difference that it does not directly cut the electrical connection upon engagement. Its engagement in fact closes the parallel circuit and that triggers the current interruption device which electrically disconnects the batteries. This means that the engagement of the pressure sensitive switch also leads to an electrical disconnection of the battery cells but in an indirect way. Even though both ways lead to a disconnection, the way is different. The first described disconnection of the battery cells by the pressure switch is a "direct" way, in opposition to the just described "indirect" way.

By providing a parallel circuit that includes the battery cells as well as the circuit interruption device and the pressure sensitive element, it is possible to use the electrical energy of the battery cells for their disconnection. Therefore it is preferred that the parallel circuit is designed to become closed upon engagement of the pressure sensitive element or the engagement of the pressure switch respectively.

Through this arrangement, sophisticated means of current interruption devices can be used without a need of external power supply. No energy is drained during normal use of the battery but in case of an emergency the battery cells provide the energy for their own disconnection, thereby already using up a small amount of their own stored energy.

The current interruption device in this case is preferably embodied as a pyrotechnical activated cutter that is engaged upon the closing of the parallel circuit.

The current interruption device may also comprise a cutting member to physically cut the electrical connection of the battery cells. The cutting member is designed to start once the parallel circuit is closed. The cutting member then disconnects the battery cells.

To ensure that the current does not increase too high, the parallel circuit preferably comprises a fuse. If the current gets too high, the fuse will be activated to disconnect or isolate the battery cells.

In another embodiment of the invention it is preferred to arrange a current interruption device that preferably comprises a pyrotechnic circuit cutting means between the electrical cells.

It may also be advantageous to embody the pressure sensitive element and the current interruption device as a pressure sensitive percussion igniter. This pressure sensitive percussion igniter may comprise a membrane or piston that transforms a pressure rise inside the battery pack in a relative motion which then triggers the cutter mechanism.

Furthermore it can be advantageous if the pressure sensitive element and the cutting member are embodied as a pressure sensitive percussion igniter. This way it is possible to combine the functions of the pressure sensitive element and the cutting member in one single component. Each pressure sensitive percussion igniter can reliably cut the electrical connection independently from other current interruption devices in case of a pressure rise.

Generally it can be advantageous if the pressure sensitive element of the current interruption device comprises a membrane or piston. In case the pressure inside the battery pack increases, its force is acting on a membrane and/or piston that create a relative motion.

Several battery cells are preferably disconnected together as a group, wherein the added current of the group is equal or less than 50 Volt DC. This measure of disconnecting ensures that the voltage of the individual groups is not in a very dangerous region, since generally voltages around 60 or above 50 Volt DC are much more harmful to humans.

With groups of battery cells with voltages of 50 Volt DC or lower, the battery pack is separated into groups or blocks of relatively non-hazardous components. The separation may include the separation of battery cells, groups and battery modules depending on their voltage. A battery module or block comprises several battery cell groups.

The separation into smaller groups plays a significant role to increase the safety of the vehicle for the following reasons.

A short circuit discharge will generate heat; the magnitude depending on the amount of electric capacity is available to be discharged by the short circuit current.

By dividing the battery pack into a number of smaller battery groups or units, a short circuit will not generate as much current as if the failing unit was connected to the complete battery pack.

The generated heat also depends on what level (battery: cell, block, module, pack or external) the short circuit appears. The heat generated from an external short circuit discharge will be uniformly distributed across the whole battery pack, while a short circuit discharge at a lower level (e.g. cell) will present a more localized heat generation.

The most dangerous scenario is a battery cell internal short circuit while the battery cell is still connected to the surrounding battery system, and the surrounding electric capacity is able to discharge through the battery cell internal short circuit. The risk of initiating thermal runaway will then be imminent, with the subsequent elevated risk of fire and explosion.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
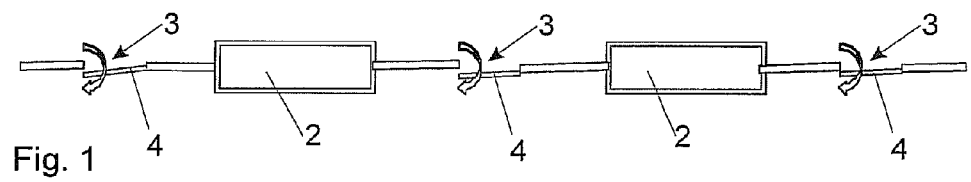
FIG. 1 shows battery cells with a pressure switch between them.

FIG. 1 shows two battery cells 2 that are part of a battery pack of a vehicle. Current interruption devices 3 are arranged between the battery cells 2. The current interruption devices 3 are embodied as pressure switches 4 which comprise a movable pressure sensitive element 5.

A pressure increase leads to an engagement of the pressure switch 4. The force of the pressure rise 1 pushes onto the pressure switch 4 and causes a movement of the movable pressure sensitive element 5. The pressure sensitive element in this embodiment is the top cover of the pressure switch 4.

Figure 2A:
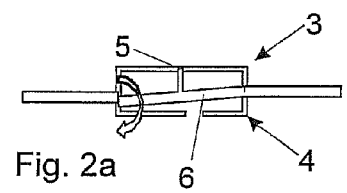
FIG. 2a shows a section view of a pressure switch which is designed to cut its electrical connection upon engagement.

FIG. 2a shows a section view of such a pressure switch 4. The electrical current passes by means of a conducting member 6 through the pressure switch 4. A movement of the pressure sensitive element 5 leads to a movement of the conducting member 6 and by moving the conducting member 6 out of its position, the electrical connection is cut. The current can no longer pass through the pressure switch 4 and the battery cells 2 become isolated.

The term electrically disconnected or isolated means that the battery cells 2 are not connected with other battery cells 2. They are disconnected and can no longer act as a power supply for the vehicle. It shall also be noted that disconnected battery cells 2 will neither serve as power supply to an electrical failure mode involving neighboring cells 2.

For the purpose of isolation it is enough to sever the connection at one side of the battery cell 2, for example on the "right" or "left" side of the battery cells 2. In FIG. 1 the battery cells 2 each are arranged between two current interruption devices 3 (one on the "left" and one on the "right"), in the shown case of FIG. 1, the connection on both sides is cut.

This disconnection is designed to take place in case of an emergency if the car and/or battery pack is damaged, for example in case of a collision. The pressure increase can be happening because of a deformation of the battery pack or due to a malfunction of the battery cells 2. However, preferably the pressure increase is intentionally caused by the release of compressed air, for example by the triggering an inflator or a compressed air cartridge from an accident indicating signal.

Figure 2B:
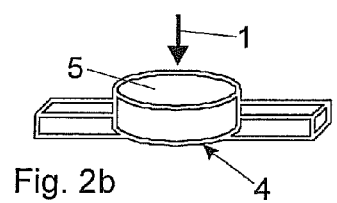
FIG. 2b shows an isometric view of a pressure switch.
Figure 2C:
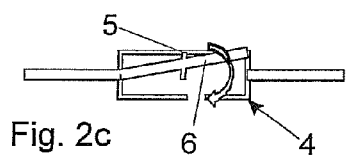
FIG. 2c shows a section view of a pressure switch which is designed to connect its electrical connection upon engagement.

FIG. 2b shows the pressure switch 4 in an isometric view, whereas FIG. 2c shows a different type of pressure switch 4.

The pressure switch 4 of FIG. 2c is also triggered by a pressure rise inside the battery pack, but it does not cut its electrical connection, it closes it. This different type of pressure switch depicted in FIG. 2c will further be labeled as "type B", the pressure switch 4 depicted in FIG. 2a as "type A".

That a pressure switch 4 of type A can be used to isolate battery cells 2 was already described with the help of FIG. 1.

Figure 3:
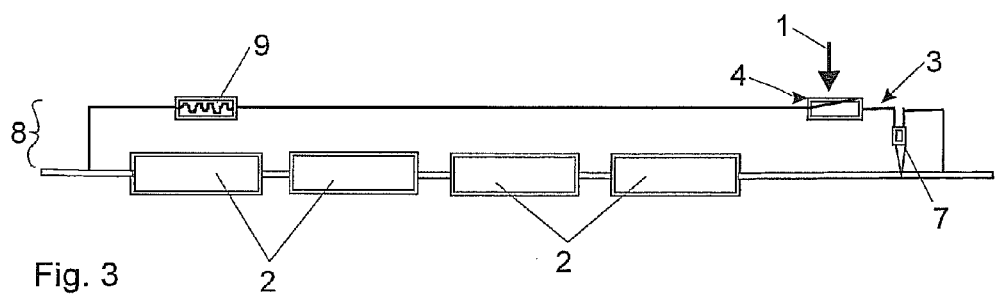
FIG. 3 shows an arrangement of battery cells and a pressure activated switch in a parallel circuit.

FIG. 3 shows a way to isolate battery cells 2 by using a pressure switch of type B. An open parallel circuit 8 is arranged including the battery cells 2, a pressure switch 4 of type B and a cutting member 7. The cutting member 7 and the pressure switch 4 are part of a current interruption device 3. The parallel circuit 8 and/or the current interruption device 3 of this embodiment therefore preferably also comprise a fuse 9.

A pressure rise 1 leads to an activation of the pressure switch 4. Since it is a pressure switch 4 of type B the pressure rise causes it to close the parallel circuit 8. This happens because the conducting member 6 of the pressure switch 4 moves into place and closes the connection. Once the parallel circuit 8 is closed, the cutting member 7 is engaged to separate the group of battery cells 2. Once the cutting member 7 has successfully cut the connection of the battery cells 2, it shuts down because the battery cells 2 are disconnected and provide no more power to the cutting member 7.

This means that the cutting member 7 causes its own shutdown once its purpose is achieved. In case the current of the parallel circuit 8 gets too high, the fuse 9 will isolates the battery cells 2. The cutting member 7 may also be embodied as a pyrotechnical activated cutter.

As is shown in FIG. 3, the current interruption device 3 functions without any external power supply, the energy is drained from the very same battery cells 2 that needs to be disconnected.

Figure 4:
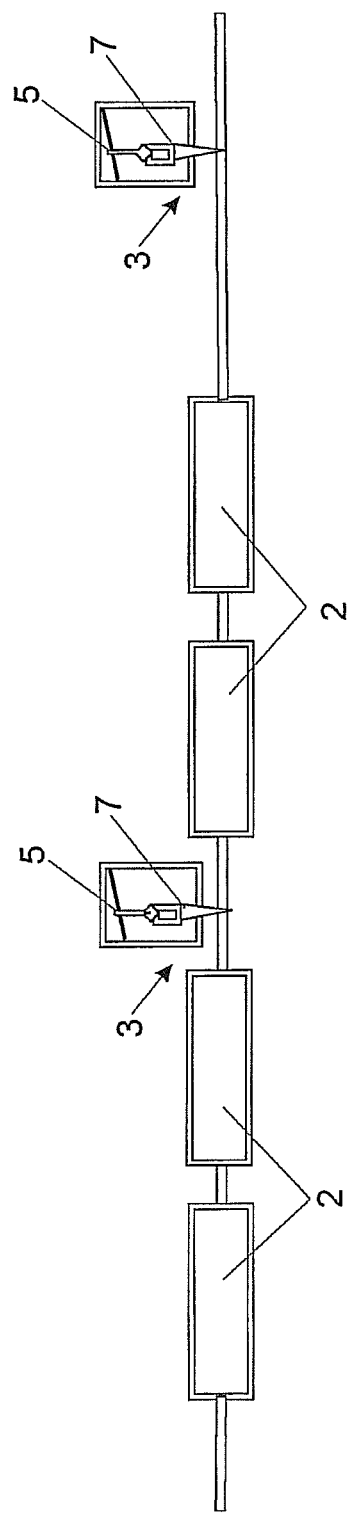
FIG. 4 shows the current interruption device embodied as pressure sensitive percussion igniter.

FIG. 4 shows another embodiment of the invention. Between two groups of two battery cells 2 each, a current interruption device 3 is placed. The current interruption device 3 comprises a pressure sensitive element 5 and a cutting member 7. The cutting member 7 is activated by the pressure sensitive element 5.

A pressure rise causes a movement of the movable pressure sensitive element 5. The pressure sensitive element 5 may for that purpose comprise a membrane and/or a piston and be embodied as a top cover or side wall.

The movement of the pressure sensitive element 5 triggers the cutting member 7 which then cuts the electrical connection between the neighboring battery cells 2.

In the depicted embodiment of the invention in FIG. 4, the pressure sensitive element 5 and the cutting member 7 (or the current interruption device 3 respectively) are embodied as a pressure sensitive percussion igniter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

REFERENCE LIST 1 pressure rise
2 battery cell
3 current interruption device
4 pressure switch
5 pressure sensitive element
6 conducting member
7 cutting member
8 parallel circuit
9 fuse

What is claimed is:

1. A battery pack for a vehicle, the battery pack comprising:
a plurality of electrically connected battery cells; and
at least one current interruption device, the at least one current interruption device includes a switch having a movable element and
a cutting member to physically cut the electrical connection of the battery cells upon closing of the switch;
wherein the movable element and the cutting member are provided in a parallel circuit such that the movable element and the cutting member are arranged parallel to at least one battery cell, the parallel circuit closed by the movable element; and
wherein electric connection of the battery cells is disconnected with the cutting member and the battery cells are electrically isolated from the at least one current interruption device with the cutting member.

2. The battery pack according to claim 1, wherein the current interruption device and the movable element are part of a pressure switch that, wherein a top cover of the pressure switch is designed to move to thereby disconnect the battery cells.

3. The battery pack according to claim 1, further comprising a fuse in the parallel circuit.

4. The battery pack according to claim 1, wherein the current interruption device comprises a pyrotechnic circuit cutting device.

5. The battery pack according to claim 1, wherein the movable element comprises a membrane or piston.

6. The battery pack according to claim 1, wherein several battery cells are disconnected together as a group and wherein an added current of the group is equal to or less than 50 Volt DC.

7. The battery pack according to claim 1, wherein the movable element and the cutting member are embodied as a pressure sensitive percussion igniter.

8. The battery pack according to claim 1, wherein a pressure increase to control the switch is caused by a release of compressed air from an accident indicating signal.

9. The battery pack according to claim 1, wherein the cutting member causes its own shutdown as a result of physically cutting an electrical connection of the battery cells.

10. The battery pack according to claim 1, wherein the switch is located remote from the battery cells.

11. The battery pack according to claim 1, wherein the current interruption device is between the switch and the battery.

12. A battery pack for a vehicle, the battery pack comprising:
at least one battery cell in a primary circuit; and
a current interruption device in a parallel, bypass circuit, the current interruption device including a switch movable between an open position and a closed position, the current interruption device further including a cutting member for cutting the primary circuit in response to closing of the switch,
wherein cutting of the primary circuit isolates the cutting member from the at least one battery cell.

13. The battery pack according to claim 12, wherein the at least one battery cell includes a plurality of battery cells.

14. The battery pack according to claim 12, wherein the switch is a pressure switch having a cover movable in response to a pressure.

15. The battery pack according to claim 12, wherein the cutting member causes its own shutdown as a result of physically cutting an electrical connection of the battery cells.

16. The battery pack according to claim 12, wherein the switch is closed in response to a release of compressed air from an accident indicating signal.

17. The battery pack according to claim 12, wherein the current interruption device is between the switch and the battery.

18. A battery pack for a vehicle, the battery pack comprising:
at least one battery cell in a primary circuit; and
a current interruption device in a parallel, bypass circuit, the current interruption device including a switch movable between an open position and a closed position, the current interruption device further including a cutting member for cutting the primary circuit in response to closing of the switch,
wherein the cutting member is located between the switch and the at least one battery cell.

\* \* \* \* \*